(12) United States Patent
Matsumaru et al.

(10) Patent No.: US 9,645,599 B2
(45) Date of Patent: May 9, 2017

(54) POWER SUPPLY MANAGEMENT DEVICE AND MACHINE TOOL HAVING THE POWER-SUPPLY MANAGEMENT DEVICE (75) Inventors: Hajime Matsumaru, Tokorozawa (JP); Satoru Akimoto, Koganei (JP); Hitoshi Matsumoto, Kawagoe (JP); Yutaka Shibui, Kawagoe (JP); Umeo Tsuyusaki, Sayama (JP); Hiroshi Shinohara, Kawagoe (JP); Shigeo Yanagidaira, Tokorozawa (JP)

(73) Assignees: Citizen Watch Co., Ltd., Tokyo (JP); Citizen Machinery Co., Ltd., Nagano (JP)

( * ) Notice: Subject to any disclaimer, the term of this patent is extended or adjusted under 35 U.S.C. 154(b) by 546 days.

(21) Appl. No.: 13/877,031

(22) PCT Filed: Sep. 30, 2011

(86) PCT No.: PCT/JP2011/072523
§ 371 (c)(1),
(2), (4) Date: Mar. 29, 2013

(87) PCT Pub. No.: WO2012/043786
PCT Pub. Date: Apr. 5, 2012

(65) Prior Publication Data
US 2013/0184893 A1    Jul. 18, 2013

(30) Foreign Application Priority Data

Oct. 1, 2010 (JP) .................................. 2010-223658

(51) Int. Cl.
*G05F 5/00* (2006.01)
*G05B 19/18* (2006.01)
*G05B 15/02* (2006.01)

(52) U.S. Cl.
CPC ............... *G05F 5/00* (2013.01); *G05B 15/02* (2013.01); *G05B 19/18* (2013.01);
(Continued)

(58) Field of Classification Search
CPC .................................. G05B 19/18; G05F 5/00
(Continued)

(56) References Cited

U.S. PATENT DOCUMENTS 4,590,572 A    5/1986  Imanishi
2002/0003414 A1    1/2002  Kuramoto
(Continued)

FOREIGN PATENT DOCUMENTS

CN    101367173 A    *    2/2009
CN    101539768 A         9/2009
(Continued)

OTHER PUBLICATIONS

Office Action mailed Mar. 24, 2015, issued for the Japanese patent application No. 2012-536577.
(Continued)

*Primary Examiner* — Carlos Ortiz Rodriguez
*Assistant Examiner* — Emilio J Saavedra
(74) *Attorney, Agent, or Firm* — Locke Lord LLP (57) ABSTRACT The present invention provides a power-supply management device which can efficiently connect and disconnect power supply to an electric-powered section, and a machine tool including the power-supply management device. The power-supply management device (101) detects a synchronization command of a control program, and compares an operation time of the electric-powered section between synchronizations in each control system which is a synchronization target by the synchronization command on the basis of the detected synchronization command. Then, the power-supply management device (101) disconnects the power supply to
(Continued)

US 9,645,599 B2

Page 2 the electric-powered section belonging to the control system except the control system having the maximum operation time of the electric-powered section between the synchronizations, and restarts the power supply at the end of the synchronization in each control system.

8 Claims, 2 Drawing Sheets (52) U.S. Cl.
CPC .............. *G05B 2219/32021* (2013.01); *G05B 2219/34306* (2013.01); *G05B 2219/34315* (2013.01); *Y02P 70/161* (2015.11); *Y02P 70/163* (2015.11); *Y02P 70/169* (2015.11); *Y02P 90/205* (2015.11)

(58) Field of Classification Search
USPC .......................................... 700/22, 170, 159
See application file for complete search history.

(56) References Cited

U.S. PATENT DOCUMENTS

2002/0138171 A1* 9/2002 Fukutani ................ B23Q 15/12
700/188

2007/0050093 A1 3/2007 Furukawa
2010/0026102 A1* 2/2010 Landgraf ........... G05B 19/0428
307/116
2010/0168897 A1 7/2010 August et al.
2011/0313574 A1* 12/2011 Schnabel ................ B41F 13/02
700/275

FOREIGN PATENT DOCUMENTS

| JP | 61-128703 U | 8/1986 | | |
|----|----|----|----|----|
| JP | 62154108 A | 7/1987 | | |
| JP | 2000-090328 A | 3/2000 | | |
| JP | 2000-94266 A | 4/2000 | | |
| JP | 2001 277071 A | 10/2001 | | |
| JP | 2003-39277 A | * | 2/2003 | ............ B23Q 15/00 |
| JP | 2003-39277 A | | 2/2003 | |
| JP | 3435229 B2 | 8/2003 | | |

OTHER PUBLICATIONS

Office Action dated Aug. 27, 2014, issued for the corresponding Chinese patent application No. 201180047746.2.
International Search Report dated Dec. 27, 2011, issued for PCT/JP2011/072523.
Supplementary Euroepan Search Report dated Apr. 13, 2016, issued for the corresponding European patent application No. 11829339.8.

* cited by examiner

| $1 | $2 | $3 |
|---|---|---|
| G50 Z0 | | |
| !2!3L1 | !1!3L1 | !1!2L1 |
| G99 M06 | | |
| G00 X13.0 Z-1.0 | | |
| M03 S1=3000 M23 S2=3000 | | |
| T2700 | | |
| T0200 | | |
| | | |
| N1 | | |
| G00 X13.0 Z-0.5 T01 | | |
| !2!3L2 | !1!3L2 | !1!2L2 |
| G01 X6.0 F0.2 | G00 Z-1.0 | G00 Z-1.0 |
| X8.0 Z0.5 F○○ | X-50.0 | |
| !2!3L3 | !1!3L3 | !1!2L3 |
| Z10.0 F | G01 Z4.0 F○○ T27 | G01 Z4.0 F○○ T37 |
| X9.0 | G00 Z-1.0 T00 | G00 Z-1.0 T00 |
| X10.0 Z10.5 | !3L4 | !2L4 |
| | T2800 | |
| | M23 S2=3000 | |

FIG.3

POWER SUPPLY MANAGEMENT DEVICE AND MACHINE TOOL HAVING THE POWER-SUPPLY MANAGEMENT DEVICE

CROSS REFERENCE TO RELATED APPLICATIONS

This application is a 371 U.S. National Phase Application of PCT/JP2011/072523 filed Sep. 30, 2011, which claims priority to Japanese Patent Application No. 2010-223658, filed Oct. 1, 2010, the disclosures of each of which are expressly incorporated herein by reference in their entireties.

TECHNICAL FIELD

The present invention relates to a power-supply management device and a machine tool having the power-supply management device.

BACKGROUND ART

A machine tool (multisystem machine tool) including a plurality of electric-powered sections for use in processing of a material, a controller which controls the operation of each electric-powered section, and a power-supply-connecting/disconnecting section which turns on/off each electric-powered section is known as a conventional machine tool (refer to, for example, Patent Document 1).

The controller of the machine tool described in Patent Document 1 includes a plurality of control systems. Each electric-powered section is connected to each control system. Each control system of the controller controls each electric-powered section based on a predetermined program. Each electric-powered section operates based on the control of the controller, so as to perform a predetermined operation. The power-supply-connecting/disconnecting section connects/disconnects power supply to a predetermined electric-powered section.

RELATED ART DOCUMENT

Patent Document

Patent Document 1: JP 3435229B

SUMMARY OF INVENTION

Technical Problem

However, in the machine tool described in Patent Document 1, the power supply is disconnected only to an electric-powered section (main shaft and tool post) in which an abnormality is determined by an abnormality determination section.

For this reason, an operator's setting is required for disconnecting the power supply to an electric-powered section which does not perform processing during a processing operation.

It is not easy for the machine tool described in Patent Document 1 to perform processing while disconnecting the power supply to each electric-powered section as appropriate, resulting in energy being wasted. A power-supply management device which can effectively connect/disconnect power supply to an electric-powered section is therefore requested.

The present invention has been made in view of the above conventional problem, and an object of the present invention is to provide a power-supply management device which can effectively connect/disconnect power supply to an electric-powered section, and a machine tool having the power-supply management device.

Solution to Problem

A power-supply management device of the present invention, which solves the above problem, includes a power-supply-connecting/disconnecting section configured to connect/disconnect power supply to a plurality of electric-powered sections operating in processing of a material, and a comparator configured to compare an operation state of each electric-powered section during the processing of the material, and detect an electric-powered section which does not require operation, wherein the power-supply connecting/disconnecting section is configured to disconnect the power supply to the electric-powered section which does not require the operation during the processing based on information from the comparator.

Preferably, the power-supply-connecting/disconnecting section is configured to disconnect the power supply to each of the electric-powered sections during the interruption or the preparation of the processing of the material, and restart the power supply to each of the electric-powered sections at the start of the processing or the restart of the processing.

Preferably, the power-supply-connecting/disconnecting section is configured to restart the power supply to a power-supply-disconnected electric-powered section at the end of the operation of the electric-powered section during the operation.

Preferably, the comparator is configured to compare the operation state between synchronizations of each of the electric-powered sections, and detect the electric-powered section which does not require the operation when each of the electric-powered sections operates before and after the synchronization.

Preferably, the comparator is configured to compare the operation time of each of the electric-powered sections between the synchronizations, and determine an electric-powered section except an electric-powered section having the maximum operation time between the synchronizations as an electric-powered section which does not require the operation, and the power-supply-connecting/disconnecting section is configured to disconnect the power supply to the electric-powered section which does not require the operation after the end of the operation between the synchronizations.

Preferably, the comparator is configured to compare the operation time of each of the electric-powered sections between the synchronizations, and determine the electric-powered section having no operation time between the synchronizations as the electric-powered section which does not require the operation.

Preferably, when a program controlling each of the electric-powered sections has a plurality of synchronization commands for synchronizing each of the electric-powered sections, the comparator is configured to detect a plurality of synchronization commands, and detect or calculate the operation time of each of the electric-powered sections between the synchronization commands, and set the operation time as the operation time of each of the electric-powered sections between the synchronizations.

Preferably, the power-supply-connecting/disconnecting section is configured to restart the power supply to the power-supply-disconnected electric-powered section at the synchronization of each of the electric-powered sections.

A machine tool of the present invention includes a plurality of electric-powered sections operating in processing of a material, and a power-supply management device configured to connect/disconnect power supply to the plurality of electric-powered sections, wherein the power-supply management device uses the power-supply management device of the present invention.

Effect of Invention

In the present invention, the power supply to the electric-powered section which does not require the operation by comparing the operation state of each of the electric-powered sections during the processing is disconnected. The present invention therefore does not require an operator's setting for disconnecting the power supply, so that the power supply to the electric-powered section can be effectively disconnected. Since the power supply to the electric-powered section can be effectively disconnected in the present invention, energy wastage can be controlled.

In the present invention, the power supply to each of the electric-powered sections is disconnected during the preparation of the processing, and the power supply is restarted to each of the electric-powered sections at the start of the processing, so that an operator's setting is not required during the preparation of the processing and at the start of the processing. In the present embodiment, the power supply to each of the electric-powered sections is disconnected during the interruption of the processing, and the power supply is restarted to each of the electric-powered sections at the restart of the processing, so that operator's setting is not required during the interruption of the processing and the restart of the processing. Therefore, the power supply to the electric-powered section can be effectively disconnected in the present invention. As a result, energy wastage can be controlled.

In the present invention, the power supply is restarted to the power-supply-disconnected electric-powered section at the end of the operation of the electric-powered section during the operation, so that an operator's setting is not required for restarting the power supply. Therefore, the power supply to the electric-powered section can be effectively disconnected. As a result, the energy wastage can be further controlled.

In the present invention, when each of the electric-powered sections operates before and after the synchronization, the power supply is restarted to the power-supply-disconnected electric-powered section at the synchronization, so that the processing operation can be smoothly performed without disturbing the execution of the processing operation after the synchronization.

In the present invention, since the operation state can be easily recognized by comparing the operation time of each of the electric-powered sections between the synchronizations when comparing the operation state between the synchronizations of each of the electric-powered sections, the power supply can be easily disconnected.

In the present invention, since the operation time of each of the electric-powered sections can be easily recognized and compared by using the synchronization command described in the program controlling each of the electric-powered sections when comparing the operation times between the synchronizations, the power supply can be further easily disconnected.

DESCRIPTION OF EMBODIMENT

Figure 1:
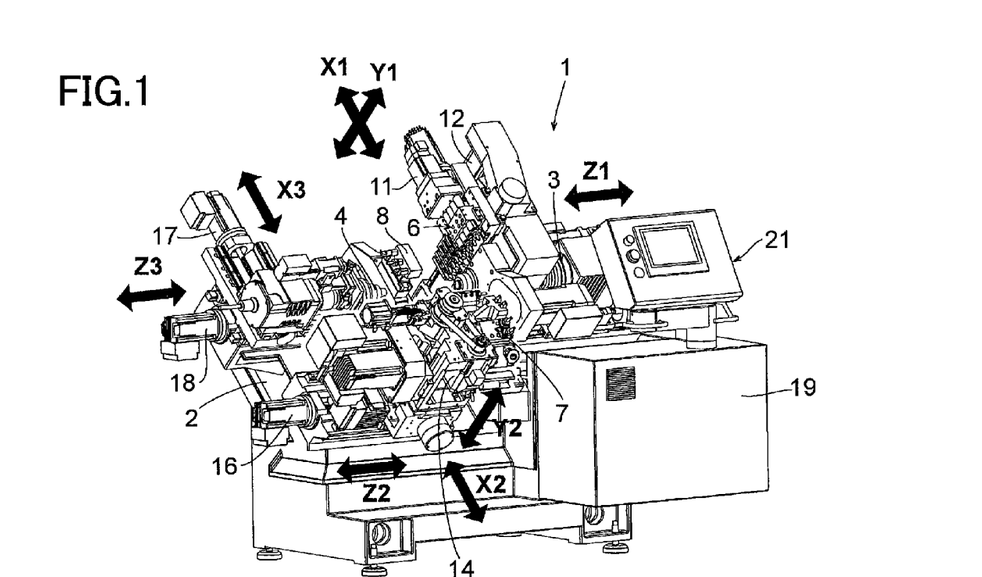
FIG. 1 is a schematic perspective view illustrating an automatic lathe as a machine tool of one embodiment of the present invention.

FIG. 1 is a schematic perspective view illustrating an automatic lathe 1 as a machine tool of one embodiment of the present invention. This automatic lathe 1 includes a bed 2 in which a main shaft and a tool post are provided. A first main shaft 3 and a second main shaft 4 are mounted on the bed 2 to face each other. A first tool post 6 and a second tool post 7 are provided in a position facing the first main shaft 3. A third tool post 8 is provided in a position facing the second main shaft 4.

The first main shaft 3 is supported to be movable in the rotary drive direction and the axis line direction (Z1 axis direction). The first tool post 6 is attached to be movable in the X1 axis direction orthogonal to the direction horizontal to the top surface of the bed 2 relative to the Z1 axis direction and the Y1 axis direction orthogonal to the direction vertical to the top surface of the bed 2 relative to the Z1 axis direction. In addition, the X1 axis direction and the Y1 axis direction are orthogonal to each other. The second tool post 7 is attached to be movable in the X2 axis direction, which is the same as the X1 axis direction, the Y2 axis direction, which is the same as the Y1 axis direction, and the Z2 axis direction, which is the same as the Z1 axis direction.

The second main shaft 4 is supported to be movable in the rotary drive direction and the axis line direction (Z3 axis direction) and the X3 axis direction orthogonal to the horizontal direction relative to the Z3 axis direction. The Z3 axis direction is the same as the Z1 axis and Z2 axis directions. The X3 axis direction is the same as the X1 axis and X2 axis directions.

A Z1 axis motor 9 (refer to FIG. 3), which moves the first main shaft 3 in the Z1 axis direction, is provided on the first main shaft 3 side. An X1 axis motor 11 which moves the first tool post 6 in the X1 axis direction is provided on the first tool post 6 side. A Y1 axis motor 12 which moves the first tool post 6 in the Y1 axis direction is provided on the first tool post 6 side.

An X2 axis motor 13 (refer to FIG. 3) which moves the second tool post 7 in the X2 axis direction is provided on the second tool post 7 side. A Y2 axis motor 14 which moves the second tool post 7 in the Y2 axis direction and a Z2 axis motor 16 which moves the second tool post 7 in the Z2 axis direction are provided on the second tool post 7 side.

An X3 axis motor 17 which moves the second main shaft 4 in the X3 axis direction is provided on the second main shaft 4 side. A Z3 axis motor 18 which moves the second main shaft 4 in the Z3 axis direction is provided on the second main shaft 4 side.

Each motor 9, 11-14, 16-18 is driven by each motor driver 9a, 11a-14a, 16a-18a (refer to FIG. 3) provided in an electric box 19 mounted on the bed 2 side. Each motor 9, 11-14, 16-18 and each motor driver 9a, 11a-14a, 16a-18a constitute an electric-powered section which can operate by power supply.

The automatic lathe 1 includes a controller 21 which controls rotation and movement of both main shafts 3, 4 and the movement of each tool post 6-8, for example.

Figure 3:
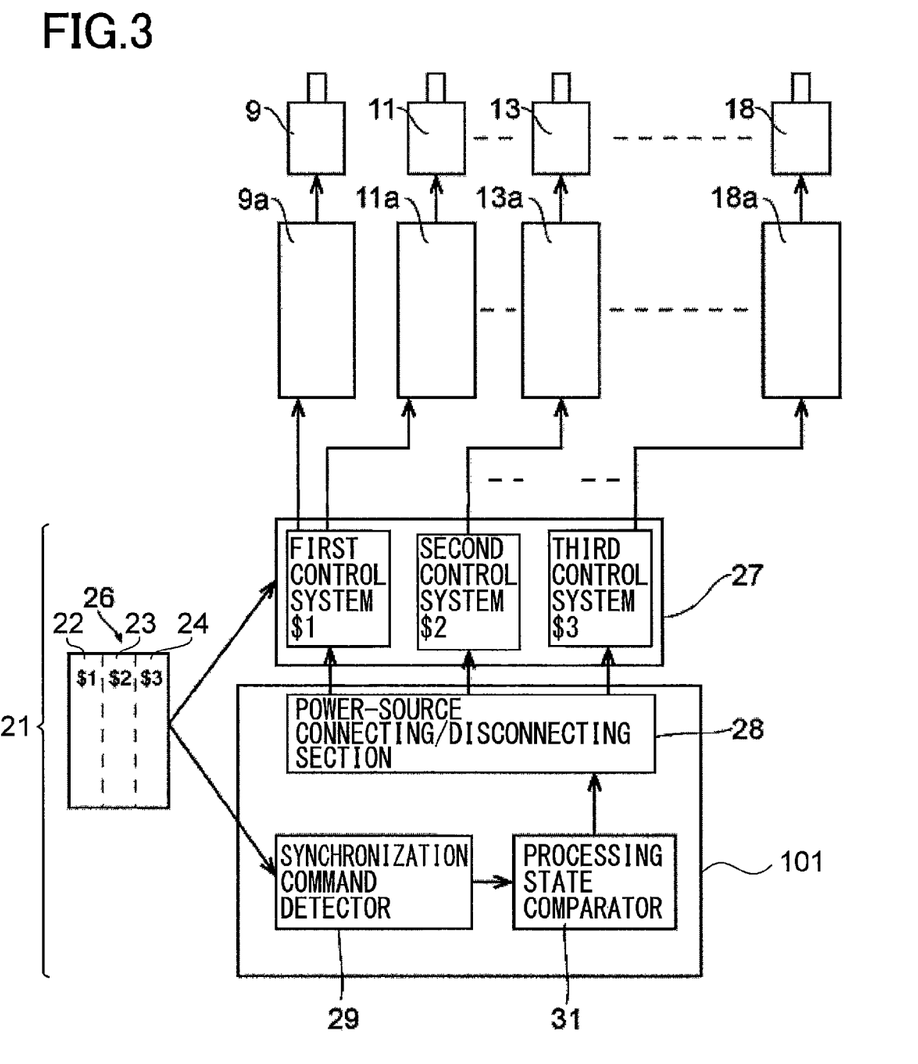
FIG. 3 is a view illustrating a relationship between a controller and electric-powered sections of the automatic lathe of the embodiment.

The controller 21 is a computer numerical controller (CNC). As illustrated in FIG. 3, the controller 21 includes a processing control program 26 and control section 27. The control contents of the operations of the main shafts 3, 4 and the tool posts 6-8 which operate by the motors 9, 11-14, 16-18, respectively, are described in the processing control program 26. The control section 27 drives each of the motors 9, 11-14, 16-18 through each of the motor drivers 9a, 11a-14a, 16a-18a based on the processing control program 26, and controls the operations of the main shafts 3, 4 and tool posts 6-8. A part of a motor and a part of a motor driver are only illustrated in FIG. 3.

Figure 2:
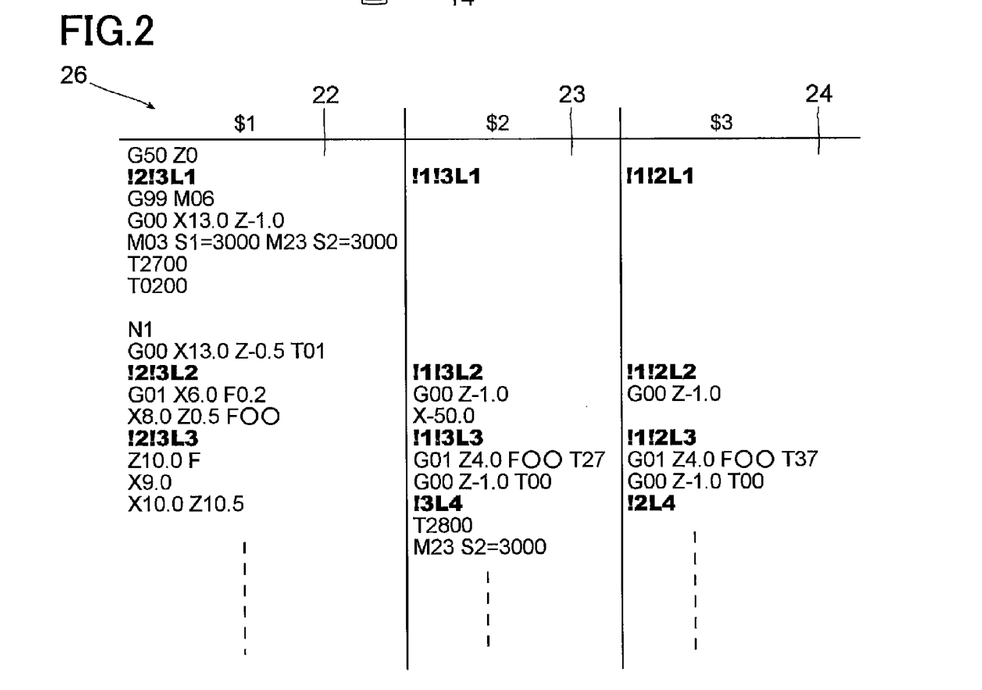
FIG. 2 is a view illustrating a part of a processing control program when processing a material in the automatic lathe of the embodiment.

The control section 27 includes three control systems (first control system $1, second control system $2, third control system $3). The processing control program 26 includes a control program 22 for the first control system $1, a control program 23 for the second control system $2, and a control program 24 for the third control program $3 as illustrated in FIG. 2.

The controller 21 controls, for example, the rotation and movement of both shafts 3, 4 and the movement of the tool posts 6, 7 with respect to each of the control systems $1, $2, $3 based on each of the control programs 22-24. The specific description will be given as follows.

An axis as each control target belongs to each control system $1, $2, $3. For example, the X1 axis, Y1 axis, and Z1 axis belong to the first control system $1. The first control system $1 controls each of the Z1 axis motor 9, X1 axis motor 11, and Y1 axis motor 12 through each of the motor drivers 9a, 11a, 12a corresponding to each of the X1 axis, Y1 axis, and Z1 axis. The control contents of the X1 axis, Y1 axis, and Z1 axis which belong to the first control system $1 are described in the control program 22 for the first control system $1.

The first control system $1 controls the driving of each of the Z1 axis motor 9, X1 axis motor 11, and Y1 axis motor 12 by controlling the driving of each of the motor drivers 9a, 11a, 12a based on the control program 22 for the first control system $1, so as to control the movement of the first main shaft 3 in the Z1 axis direction and the movement of the first tool post 6 in the X1 axis and Y1 axis directions.

The X2 axis, Y2 axis, and Z2 axis belong to the second control system $2. The second control system $2 controls each of the X2 axis motor 13, Y2 axis motor 14, and Z2 axis motor 16 through each of the motor drivers 13a, 14a, 16a corresponding to each of the X2 axis, Y2 axis, and Z2 axis. The control contents of the X2 axis, Y2 axis, and Z2 axis which belong to the second control system $2 are described in the control program 23 for the second control system $2.

The second control system $2 controls the driving of each of the X2 axis motor 13, Y2 axis motor 14, and Z2 axis motor 16 by controlling the driving of each of the motor drivers 13a, 14a, 16a based on the control program 23 for the second control system $2, so as to control the movement of the second tool post 7 in the X2 axis direction, Y2 axis direction, and Z2 axis direction.

The X3 axis and Z3 axis belong to the third control system $3. The third control system $3 controls each of the X3 axis motor 17 and Z3 axis motor 18 through each of the motor drivers 17a, 18a corresponding to each of X3 axis and Z3 axis. The control contents of the X3 axis and Z3 axis which belong to the third control system are described in the control program 24 for the third control system $3.

The third control system $3 controls the driving of each of the X3 axis motor 17 and Z3 axis motor 18 by controlling the driving of each of the motor drivers 17a, 18a based on the control program 24 for the third control system $3, so as to control the movement of the second main shaft 4 in the X3 axis and Z3 axis directions.

In the automatic lathe 1 of the above-described embodiment, both main shafts 3, 4 and the tool posts 6, 7 are controlled by the controller 21. Both main shafts 3, 4 thereby hold a material. The automatic lathe 1 processes the material held in both main shafts 3, 4 into a predetermined shape by a processing tool mounted on each of tool posts 6, 7, 8.

The controller 21 includes a power-supply-connecting/disconnecting section 28 connected to the control section 27, a processing state comparator 31 connected to the power-supply-connecting/disconnecting section 28 and a synchronization command detector 29 connected to the processing state comparator 31. In the present embodiment, the power-supply management device 101 includes the power-supply-connecting/disconnecting section 28, processing state comparator 31, and synchronization command detector 29. The processing state comparator 31 and the synchronization command detector 29 constitute a comparator of the present invention.

Before describing the contents of the power-supply management device 101, a synchronization command will be described. Each of the control programs 22-24 for each of the control systems $1-$3 includes the synchronization command. This synchronization command is for synchronizing the various controls of each of the control systems $1-$3 at the start of the operation, a predetermined time during the operation and the end of the operation (aligning start and end of various control operations). Each of the control systems $1-$3 can perform the various operations (various processing operations) in relation to each other by the synchronization command.

As indicated in the processing control program 26 of FIG. 2, for example, the synchronization command is configured such that an identifier of a synchronization command is indicated in numbers following L, and a control system as a target for synchronization is indicated in a system number following "!".

The synchronization command "!2 !3 L1" described in the control program 22 of the first control system $1 means that the second and third control systems $2, $3 are the synchronization targets relative to the first control system $1.

The synchronization command "!1 !3 L1" for synchronizing the first and third control systems $1, $3 is described in the control program 23 of the second control system $2. The synchronization command "!1 !2 L1" for synchronizing the first and second control systems $1, $2 is described in the control program 24 of the third control system $3.

The synchronization command detector 29 searches "!" in the control programs 22-24 of the control systems $1-$3.

The processing state comparator 31 compares the operation state of each control system $1-$3 which is the synchronization target based on the synchronization command detected by the synchronization command detector 29.

The processing state comparator 31 previously analyzes the processing control program 26, and detects the synchronization command having the same identifier in all of the control systems $1-$3. Then, the processing state comparator 31 detects or calculates the execution time of the processing operation (operation time of electric-powered section) which is performed between the detected synchronization command and the last synchronization command before the detected synchronization command with respect to each of the control systems $1-$3, compares the detected or calculated execution times, and commands to the power-supply-connecting/disconnection section 28 so as to disconnect the power supply to a control system except a control system having the maximum execution time.

The power-supply-connecting/disconnecting section 28 connects/disconnects the power supply to the motor and the motor driver corresponding to the motor, which belong to the control system instructed by the processing state comparator 31. More specifically, the power-supply-connecting/disconnecting section 28 disconnects the motor and the motor driver after the end of the control executed between the synchronization command detected by the synchronization command detector 29 and the last synchronization command before the detected synchronization command. Then, the power-supply-connecting/disconnection section 28 restarts the power supply to the power-supply-disconnected motor and motor driver at the end of the synchronization in each of the control systems.

The processing state comparator 31 and the power-supply-connecting/disconnecting section 28 regard the start of each control program 22-24 as the last synchronization command with respect to the synchronization command first-detected in each control system $1-$3.

In the case of the processing control program 26 illustrated in FIG. 2, the synchronization command of the identifier L1, the synchronization command of the identifier L2 and the synchronization command of the identifier L3 are detected in the control programs 22-24 of the control systems $1-$3, respectively. The synchronization command of the identifier L4 is detected in the control program 23 of the second control system $2 and the control program 24 of the third control system $3.

In the first control system $1, (G50 Z0) is executed as the control (processing operation) from the start of the control program 22 to the synchronization command (!2 !3 L1) of the identifier L1. In the second and third control systems $2, $3, the control is not performed from the start of the control programs 23, 24 to the synchronization commands (!1 !3 L1) (!1 !2 L1) of the identifier L1.

The processing state comparator 31 therefore determines the first control system $1 as the control system having the maximum execution time from the start of the control programs 22-24 to the synchronization command of the identifier L1. Thereby, the processing state comparator 31 instructs to the power-supply-connecting/disconnecting section 28 that the second and third control systems $2, $3 are power-supply-disconnecting systems. After receiving this instruction, the power-supply-connecting/disconnecting section 28 disconnects the power supply to the motors and the motor drivers belonging to the second and third control systems $2, $3 from the start of the control programs 23, 24 to the synchronization command of the identifier L1.

Next, the power-supply-connecting/disconnecting section 28 restarts the power supply to the motors and the motor drivers belonging to each of the second control system $2 and the third control system $3 after the end of the control (G50 Z0) of the first control system $1, when executing the synchronization command (!2 !3 L1), or a predetermined time before the end of the control (G50 Z0). In addition, since the control contents described in the processing control program 26 are generally known, the detailed description thereof will be omitted.

Next, in the first control system $1, from the synchronization command of the identifier L1 (!2 !3 L1) to the synchronization command of the identifier L2 !3 L2), (G99 M06-G00 X13.0 Z-0.5 T01) is executed as the control. In the second and third control systems $2, $3, from the synchronization command of the identifier L1 (!1 !3 L1), (!1 !2 L1) to the synchronization command of the identifier L2 (!1 !3 L2), (!1 !2 L2), the control is not performed.

The processing state comparator 31 therefore instructs to the power-supply-connecting/disconnecting section 28 the second and third control systems $2, $3 as the power source disconnecting systems. After receiving this instruction, the power-supply-connecting/disconnecting section 28 disconnects the power supply to the motors and the motor drivers belonging to the second and third control systems $2, $3 from the synchronization command of the identifier L1 to the synchronization command of the identifier L2.

Next, the power-supply-connecting/disconnecting section 28 restarts the supply of the power source to the motors and the motor drivers belonging to the second and third control systems $2, $3 after the end of the control (G99 M06-G00 X13.0 Z-0.5 T01) of the first control system $1, when executing the synchronization command (!2 !3 L2) or a predetermined time before the end of the control of the first control system $1.

Next, in the first control system $1, (G01 X6.0 F0.2-X8.0 Z0.5 F∞) is executed from the synchronization command of the identifier L2 (!2 !3 L2) to the synchronization command of the identifier L3 (!2 !3 L3) as the control.

In the second control system $2, (G00 Z-1.0-X-50.0) is executed from the synchronization command of the identifier L2 (!1 !3 L2) to the synchronization command of the identifier L3 (!1 !3 L3) as the control.

In the third control system $3, (G00 Z-1.0) is executed from the synchronization command of the identifier L2 (!1 !2 L2) to the synchronization command of the identifier L3 (!1 !2 L3) as the control.

In this case, the processing state comparator 31 detects or calculates the execution time of each control system $1-$3, and determines that the execution time of the first control system $1 is the maximum. The processing state comparator 31 therefore instructs to the power-supply-connecting/disconnecting section 28 that the power supply is not necessary for the second and third control systems $2, $3 after the end of the control.

After receiving this instruction, the power-supply-connecting/disconnecting section 28 disconnects the power supply to the motors and the motor drivers belonging to the second and third control systems $2, $3 until the synchronization command of the identifier L3 after the end of the control.

Next, the power-supply connecting/disconnecting section 28 restarts the power supply to the motors and the motor drivers belonging to the second and third control systems $1, $3 after the end of the control of the first control system $1, when executing the synchronization command (!2 !3 L2), or a predetermined time before the end of the control of the first control system $1.

As described above, in the automatic lathe 1 (power-supply management device 101) of the present embodiment, when the synchronization command of the processing control program 26 is detected, the power supply to the motor and the motor driver belonging to the control system except the control system having the maximum execution time between the detected synchronization command and the last synchronization command before the detected synchronization command in the control systems as the synchronization targets is disconnected after the end of the operation between the detected synchronization command and the last synchronization command before the detected synchronization command. Then, the power-supply management device 101 restarts the power supply at the end of the synchronization in each of the control systems.

Accordingly, the automatic lathe 1 of the present embodiment effectively connects/disconnects the power supply to the electric-powered section because it does not require an operator's setting for disconnecting and restarting the power supply to the electric-powered section. The automatic lathe 1 of the present embodiment can effectively connect/disconnect the power supply to the electric-powered section, so that energy wastage can be controlled.

In addition, in the automatic lathe 1 of the present embodiment, when each motor and each motor driver operate before and after the synchronization, the power supply to the electric-powered section to which the power supply is disconnected before the synchronization is restarted at the time of synchronization. The processing operation can be therefore smoothly performed without disturbing the execution of the processing operation after the synchronization.

In the automatic lathe 1 of the present embodiment, the operation times between the synchronizations are compared when comparing the operation states of each motor and each motor driver between the synchronizations. In this way, the operation state between the synchronizations can be easily recognized, so that the power supply can be easily disconnected.

In the automatic lathe 1 of the present embodiment, when comparing the operation times between the synchronizations, the synchronization command described in the processing control program 26 controlling each electric-powered section is used. Consequently, the operation times between the synchronizations can be easily recognized, and compared, so that the power supply can be further easily disconnected.

When disconnecting the power supply to the motor and the motor driver, the control of the motor or the like by the controller 21 can be normally continued by a normal disconnecting flag provided for discriminating from a problem in a motor and a motor driver or the like.

The power-supply-connecting/disconnecting section 28 can set in the process control program 26 a motor and a motor driver to which the disconnection of power supply is controlled among the motors and the motor drivers belonging to the control systems $1-$3. In this case, the power supply to the motor and the motor driver to which the disconnection of the power supply in processing or the like becomes a problem can be continued. The rotation of a motor which rotates a rotation tool such as the main shafts 3, 4, drill, or tap can be continued as appropriate. Moreover, an operation unit (for example, setting screen) for setting the motor and the motor driver to which the disconnection of the power supply is controlled can be provided in the automatic lathe 1.

In the processing control program 26 of FIG. 2, in the second control system $2, (G01 Z4.0 F∞ T27-G00 Z-1.0 T00) is executed as the control from the synchronization command of the identifier L3 (!1 !3 L2) to the synchronization command of the identifier L4 (!3 L4).

In the third control system $3, (G01 Z4.0 F∞ T27-G00 Z-1.0 T00) is executed as the control from the synchronization command of the identifier L3 (!1 !2 L3) to the synchronization command of the identifier L4 (!2 L4).

In this case, the control is simultaneously completed in both control systems $2, $3. When the control in each control system is simultaneously completed, the power supply can be connected/disconnected to the motor and the motor driver without instructing to the power-supply-connecting/disconnecting section 28 the disconnection of the power supply to any of the control systems.

The processing state comparator 31 can be configured as follows when detecting the synchronization command. The processing state comparator 31 checks a block (program line) during the execution of the control program of the control system which is the synchronization target. As a result, when there is a control system in which the synchronization command corresponding to the detected synchronization command has not been executed yet, the control system in which the synchronization command is detected is instructed to the power-supply-connecting/disconnecting section 28 as a power-supply disconnecting system. When the synchronization command corresponding to the detected synchronization command has already been executed in each control system, the control system which is the synchronization target is instructed to the power-supply-connecting/disconnecting section 28 as the power-supply restart system.

After receiving the instruction of the power-supply-disconnecting system, the power-supply-connecting/disconnecting section 28 disconnects the power supply to the motor and the motor driver belonging to the power-supply-disconnecting system. After receiving the instruction of the power-supply restart system, the power-supply-connecting/disconnecting section 28 restarts the power supply to the motor and the motor driver belonging to the power-supply restart system.

In the case of sequentially executing each control program, when the synchronization command is detected, the power supply to the motor and the motor driver belonging to the control system except the control system in which the execution time between the detected synchronization command and the last synchronization command before the detected synchronization command is the maximum in the respective control systems which are the synchronization targets is disconnected after the end of the control between the detected synchronization command and the last synchronization command before the detected synchronization command. Then, at the end of the synchronization, in each control system, the power supply is restarted to the power-supply-disconnected motor and the motor driver.

For this reason, the processing of the material can be performed while automatically connecting/disconnecting the power supply to a predetermined motor and a predetermined motor driver which become a standby state during the processing operation of the material without previously analyzing the processing control program 26 (control program 22-24 for each control system $1-$3). The energy consumption of the automatic lathe 1 can be thereby reduced.

When providing a program editing function which can draw up and edit the processing control program 26 (each control program) in the controller 21, the power-supply-connecting/disconnecting section 28 can be configured to disconnect the power supply to all of the motors and the motor drivers when editing the processing control program 26.

The main shaft and the tool post positioned by the motor and the motor driver may displace when the power supply is disconnected by the power-supply-connecting/disconnecting section 28.

The controller 21 can be constituted as follows relative to the above case. The controller 21 previously stores the positions of the main shaft and the tool post when disconnecting the power supply. Next, the controller 21 calculates the difference between the position in the restart and the position in the disconnection at the restart of the power supply, and the main shaft and the tool post are set back to the original positions (positions when disconnecting power supply) by driving a motor based on this difference. With this configuration, the positional displacement of the main shaft and the tool post generating along the disconnection of the power supply can be prevented, and a decrease in the processing accuracy can be avoided.

When it is considered that the main shaft and the tool post are moved in an unsafe area by the displacement of the main shaft and the tool post, the communication between a motor detector or an external detector, which detects the positions of the main shaft and the tool post (rotation position of motor shaft), and the controller 21 side can be always continued. When detecting the movement to the unsafe area, the power-supply-connecting/disconnecting section 28 restarts the power supply to the motor and the motor driver, so that the positions of the main shaft and the tool post are controlled so as not to move to the unsafe area or so as to escape from the unsafe area.

When setting the main shaft and the tool post back to the original positions (position when disconnecting power supply), the controller 21 can calculate a next power-on time of the power-supply-disconnected motor and the motor driver by calculating the execution time of each block after the next block of the synchronization command which determines the disconnection of the power supply.

In this case, the controller 21 calculates the total time of the operation recovery time until the motor and the motor driver normally operate after the restart of the power supply and the time (return position movement time) which sets the main shaft and the tool post back to the original positions. The power-supply-connecting/disconnecting section 28 can disconnect the power supply to the motor and the motor driver when the next power-on time is long (slow) from the total time.

After the restart of the power supply to the motor and the motor driver, the control of the processing operation (next command execution) can be restarted after the passage of the total time of the operation recovery time and the return position movement time, or by receiving the recovery end signal from the motor driver. After the restart of the power supply, time loss may occur until the control of the processing operation is restarted. Therefore, the power supply can be restarted before the total time of the operation recovery time and the return position movement time by the execution of the next block (program line) after the synchronization command.

The restart of the power supply includes the following in addition to the automatic restart by the power-supply-connecting/disconnecting section 28 based on the processing control program 26. The instruction of the power supply is described in each of the control programs 22-24 for each of the control systems $1-$3 in the processing control program 26. Moreover, another energy management program different from the control program for each of the control systems $1-$3 is prepared, and the connection/disconnection of the power supply to the motor and the motor driver is controlled based on the energy management program.

The power-supply management device 101 can disconnect and restart the power supply to the motor and the motor driver unrelated to material change or product recovery based on the instruction of the material change or the instruction of the recovery of the processed product in addition to the control of the power supply to the motor and the motor driver based on the synchronization command. A mode (energy saving mode) which controls the power supply to the motor and the motor driver and a mode (normal drive mode) which does not control the power supply to the motor and the motor driver can be provided in the controller 21, and the modes can be switched.

The control section 27 of the controller 21, power-source connecting/disconnecting section 28, synchronization command detector 29, processing state comparator 31 and the like are operated by software or hardware in accordance with a program previously stored in the controller 21, hardware previously provided in the controller 21 or the like.

Although the embodiment of the present disclosure has been described above, the present disclosure is not limited thereto. It should be appreciated that variations may be made in the embodiment described by persons skilled in the art without departing from the scope of the present disclosure.

CROSS-REFERENCE TO RELATED APPLICATION

The present application is based on and claims priority from Japanese Patent Application No. 2010-223658, filed on Oct. 1, 2010, the disclosure of which is hereby incorporated by reference in its entirety.

DESCRIPTION OF REFERENCE NUMERAL

1 Automatic lathe (machine tool)
9, 11-14, 16-18 Motor (electric-powered section)
9a, 11a-14a, 16a-18a Motor driver (electric-powered section)
21 Controller
22 Control program for first control system
23 Control program for second control system
24 Control program for third control system
28 Power-supply-connecting/disconnecting section
26 Processing control program
29 Synchronization command detector (comparator)
31 Processing state comparator (comparator)
101 Power-supply management device

The invention claimed is:
1. A power-supply management device, comprising:
a power-supply-connecting/disconnecting section configured to connect/disconnect power supply to a plurality of electric-powered sections provided in a machine tool, the electric-powered sections operating in processing of a material held in the machine tool; and
a comparator configured to compare a powered-on state of each electric-powered section during the processing of the material, and detect an electric-powered section which does not need to be powered-on, wherein the power-supply-connecting/disconnecting section is configured to disconnect the power supply to the electric-powered section which does not need to be powered-on during the processing of the machine tool based on information from the comparator,
the comparator is configured to compare the powered-on state between synchronizations of each of the electric-powered sections in response to a detection of a synchronization command of a control program, and detect the electric-powered section which does not need to be powered-on when each of the electric-powered sections is powered-on before and after the synchronization,
the comparator is configured to compare an amount of time each of the electric-powered sections has been powered-on between the synchronizations, and determine an electric-powered section, except an electric-powered section having a maximum powered-on time between the synchronizations, as an electric-powered section which does not need to be powered-on, and the power-supply-connecting/disconnecting section is configured to disconnect the power supply to the electric-powered section which does not need to be powered on after the end of an operation between the synchronizations.

2. The power-supply management device according to claim 1, wherein
the power-supply-connecting/disconnecting section is configured to disconnect the power supply to each of the electric-powered sections during interruption or preparation of the processing of the material, and connect the power supply to each of the electric-powered sections at the start of the processing or restart of the processing.

3. The power-supply management device according to claim 1, wherein
the power-supply-connecting/disconnecting section is configured to connect the power supply to a power-supply-disconnected electric-powered section when the electric-powered section is no longer powered-on during the operation.

4. The power-supply management device according to claim 1, wherein
the comparator is configured to compare the amount of time each of the electric-powered sections has been powered-on between the synchronizations, and determine the electric-powered sections that were not powered-on between the synchronizations as an electric-powered section which does not need to be powered-on.

5. The power-supply management device according to claim 1, wherein
when a program controlling each of the electric-powered sections has a plurality of synchronization commands for synchronizing each of the electric-powered sections, the comparator is configured to detect a plurality of synchronization commands, and detect or calculate the powered-on time of each of the electric-powered sections between the synchronization commands, and set the powered-on time as the powered-on time of each of the electric-powered sections between the synchronizations.

6. The power-supply management device according to claim 1, wherein
the power-supply-connecting/disconnecting section is configured to connect the power supply to the power-supply-disconnected electric-powered section at the synchronization of each of the electric-powered sections.

7. The power-supply management device according to claim 1, wherein each of the plurality of electric-powered sections includes a motor and a corresponding motor driver.

8. A machine tool, comprising:
a plurality of electric-powered sections operating in processing of a material; and
a power-supply management device configured to connect/disconnect power supply to the plurality of electric-powered sections, wherein
the power-supply management device uses the power-supply management device according to claim 1.

* * * * *